US012590547B2

(12) United States Patent
Austin et al.

(10) Patent No.: US 12,590,547 B2
(45) Date of Patent: Mar. 31, 2026

(54) SPLIT CASE WITH COATABLE TRANSISTION FEATURE

(71) Applicant: RTX Corporation, Farmington, CT (US)

(72) Inventors: Michael Davis Austin, Meriden, CT (US); Mason Adam Kessler, Rocky Hill, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/060,099

(22) Filed: Feb. 21, 2025

(65) Prior Publication Data

US 2025/0198307 A1 Jun. 19, 2025

Related U.S. Application Data

(62) Division of application No. 18/540,525, filed on Dec. 14, 2023.

(51) Int. Cl.
*F01D 25/14* (2006.01)
*F01D 25/24* (2006.01)

(52) U.S. Cl.
CPC ........... *F01D 25/145* (2013.01); *F01D 25/24* (2013.01); *F05D 2220/32* (2013.01); *F05D 2230/10* (2013.01); *F05D 2240/14* (2013.01); *F05D 2260/231* (2013.01)

(58) Field of Classification Search
CPC ............................... F01D 25/145; F01D 25/24
See application file for complete search history.

(56) References Cited

U.S. PATENT DOCUMENTS 5,645,399 A 7/1997 Angus
6,848,885 B1 2/2005 Maclean
7,070,387 B2 * 7/2006 Crozet ................. F01D 25/145 415/173.1
7,246,996 B2 7/2007 Harris
7,607,885 B2 10/2009 Bosley et al.
(Continued)

FOREIGN PATENT DOCUMENTS

EP 1362983 A2 11/2003
EP 2900978 B1 11/2017

OTHER PUBLICATIONS

Choy, Computer-Aided Design 35, A corner-looping based tool path for pocket milling (Year: 2003).*
(Continued)

*Primary Examiner* — Courtney D Heinle
*Assistant Examiner* — John S Hunter, Jr.
(74) *Attorney, Agent, or Firm* — CANTOR COLBURN LLP

(57) ABSTRACT

A split case is provided. The split case includes a first section including an interior surface with a first linear portion, a second section including a hook, a third section interposed between the first and second sections and including an interior surface with a second linear portion intersecting and forming a first angle with the first linear portion and first and second thermal barrier coating (TBC) portions applied to at least the first and second linear portions, respectively. A magnitude of the first angle is established such that the first and second TBC portions form a second angle substantially equal to the first angle.

9 Claims, 3 Drawing Sheets

(56) References Cited

U.S. PATENT DOCUMENTS

| | | | |
|---|---|---|---|
| 9,079,245 B2 | 7/2015 | Durocher et al. | |
| 9,181,877 B2 | 11/2015 | Travis et al. | |
| 11,021,987 B2 | 6/2021 | Clark et al. | |
| 2014/0030071 A1 | 1/2014 | Leslie et al. | |
| 2017/0356308 A1* | 12/2017 | Rammohan ............. | B22F 5/009 |

OTHER PUBLICATIONS

Search Report issued in European Patent Application No. 24219793.7; Date of Mailing May 22, 2025 (10 pages).

* cited by examiner

SPLIT CASE WITH COATABLE TRANSISTION FEATURE

CROSS-REFERENCE TO RELATED APPLICATIONS

This application is a division of U.S. application Ser. No. 18/540,525 filed Dec. 14, 2023, the disclosure of which is incorporated herein by reference in its entirety.

BACKGROUND

Exemplary embodiments of the present disclosure relate generally to gas turbine engines and, in one embodiment, to a split case of a gas turbine engine with a coatable transition feature.

In a gas turbine engine, air is compressed in a compressor and compressor air is then mixed with fuel and combusted in a combustor to produce a high-temperature and high-pressure working fluid. This working fluid is directed into a turbine in which the working fluid is expanded to generate power. The generated power drives the rotation of a rotor within the turbine through aerodynamic interactions between the working fluid and turbine blades or airfoils. The rotor can be used to drive rotations of a propeller or fan or to produce electricity in a generator.

Since the interiors of the compressor, the combustor and the turbine are often exposed to high temperatures, it is typically necessary to coat at least portions of interior surfaces of these features with thermal barrier coating (TBC) or other similar materials. This coating process can sometimes be difficult.

Accordingly, a need exists for a casing of a compressor section of a gas turbine engine, for example, that can be more easily coated.

BRIEF DESCRIPTION

According to an aspect of the disclosure, a split case is provided. The split case includes a first section including an interior surface with a first linear portion, a second section including a hook, a third section interposed between the first and second sections and including an interior surface with a second linear portion intersecting and forming a first angle with the first linear portion and first and second thermal barrier coating (TBC) portions applied to at least the first and second linear portions, respectively. A magnitude of the first angle is established such that the first and second TBC portions form a second angle substantially equal to the first angle.

In accordance with additional or alternative embodiments, there is an absence of a cusp formed at an intersection point of the first and second linear portions.

In accordance with additional or alternative embodiments, the first angle has a magnitude of about 120°.

In accordance with additional or alternative embodiments, the first linear portion is oriented substantially along a radial dimension.

In accordance with additional or alternative embodiments, the first linear portion is oriented short of the radial dimension.

In accordance with additional or alternative embodiments, the interior surface of the first section has a curvilinear portion which extends from the first linear portion.

In accordance with additional or alternative embodiments, the hook includes a radial section and an axial section extending away from the first angle from an inboard end of the radial section.

In accordance with additional or alternative embodiments, a distance between an interior corner of the hook and the second linear portion exceeds a thickness of the axial section.

According to an aspect of the disclosure, a split case is provided and includes a first section including an interior surface with a first linear portion, a second section including a hook, a third section interposed between the first and second sections and including an interior surface with a second linear portion intersecting and forming a simple angle with the first linear portion at an intersection point of the first and second linear portions.

In accordance with additional or alternative embodiments, there is an absence of a cusp formed at the intersection point.

In accordance with additional or alternative embodiments, the simple angle has a magnitude of about 120°.

In accordance with additional or alternative embodiments, the first linear portion is oriented substantially along a radial dimension.

In accordance with additional or alternative embodiments, the first linear portion is oriented short of the radial dimension.

In accordance with additional or alternative embodiments, the interior surface of the first section has a curvilinear portion which extends from the first linear portion.

In accordance with additional or alternative embodiments, the hook includes a radial section and an axial section extending away from the simple angle from an inboard end of the radial section.

In accordance with additional or alternative embodiments, a distance between an interior corner of the hook and the second linear portion exceeds a thickness of the axial section.

In accordance with additional or alternative embodiments, the split case further includes first and second thermal barrier coating (TBC) portions applied to at least the first and second linear portions, respectively.

According to an aspect of the disclosure, a split case formation method is provided and includes casting a split case including first, second and third sections, the first section including an interior surface with a first linear portion, the second section including a hook and the third section being interposed between the first and second sections and machining the third section to form an interior surface with a second linear portion such that the second linear portion intersects and forms a simple angle with the first linear portion at an intersection point of the first and second linear portions.

In accordance with additional or alternative embodiments, the machining includes positioning a machining tool in position to machine the third section, moving the machining tool in a linear pathway along the third section to form the second linear portion and maintaining an orientation of the machining tool during an entirety of the machining.

In accordance with additional or alternative embodiments, the split case formation method further includes applying first and second thermal barrier coating (TBC) portions to at least the first and second linear portions, respectively.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
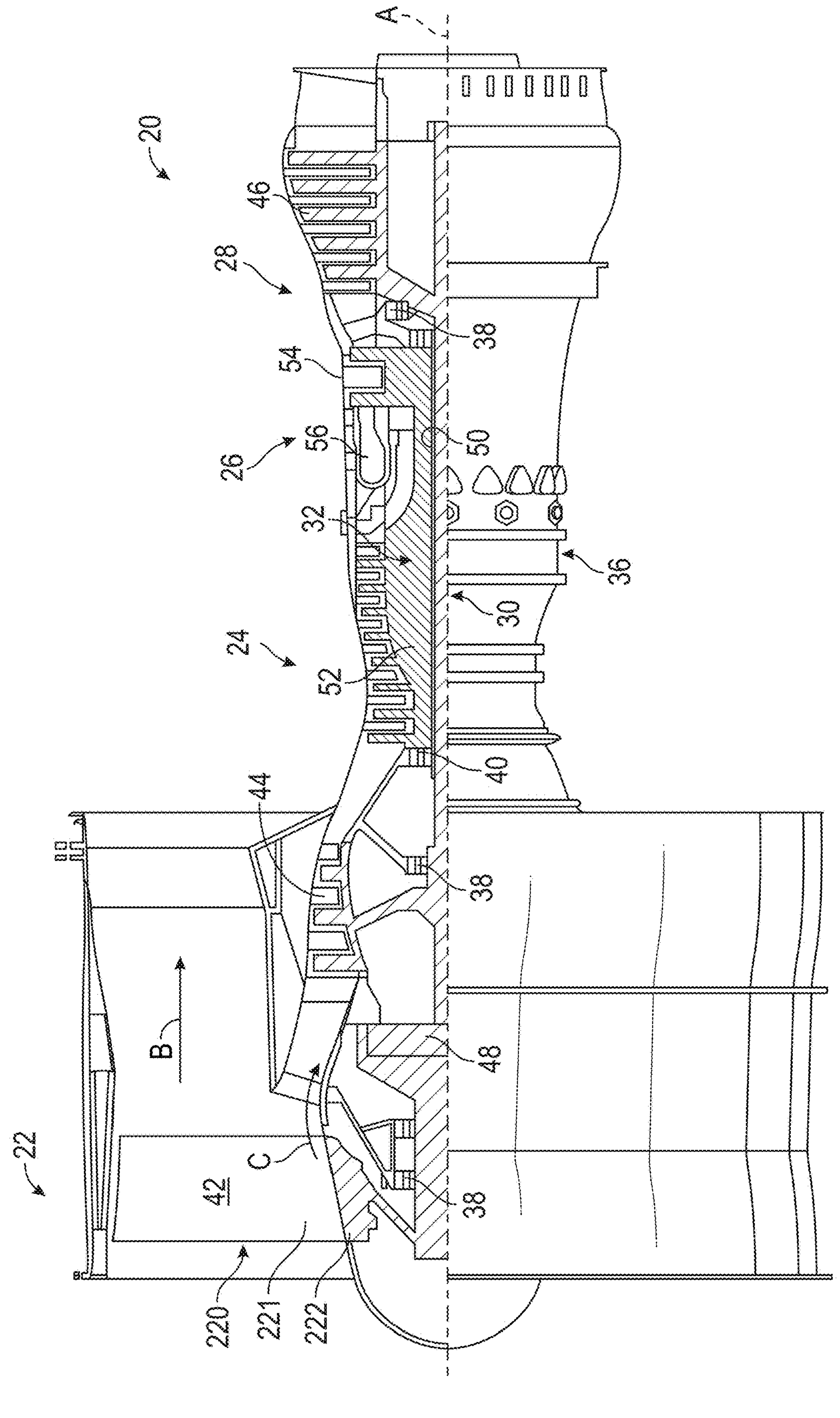
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

Currently, casings for the compressor section 24 in particular include an air seal hook of a split case, which has a TBC applied to it. It has been found, however, that since a side of the split case has a first surface that has both vertical and curved portions as well as a second surface that is angled and forms a shallow angle with the vertical portion of the first surface, the machining process that forms the second surface tends to be executed such that subsequent coating processes form a burr or cusp at the shallow angle. The machining process in question involves a machining tool, which is used to machine the second surface, having to be rotated as the machining tool approaches the shallow angle This rotation results in a rounded-off portion of the second surface.

Accordingly, a need exists for a compressor section casing that has a split case that can be coated with TBC or other similar materials without forming a burr or cusp at an angle between surfaces.

Therefore, as will be described below, a compressor section casing that has a split case is provided with two surfaces that forming a relatively large angle in order to improve TBC coatability and avoid the formation of a burr or cusp at the angle. The resulting TBC has a smooth appearance with a desired quality. The relatively large angle is limited by a need to maintain a thickness of a portion of the split case with a hook feature.

Figure 2:
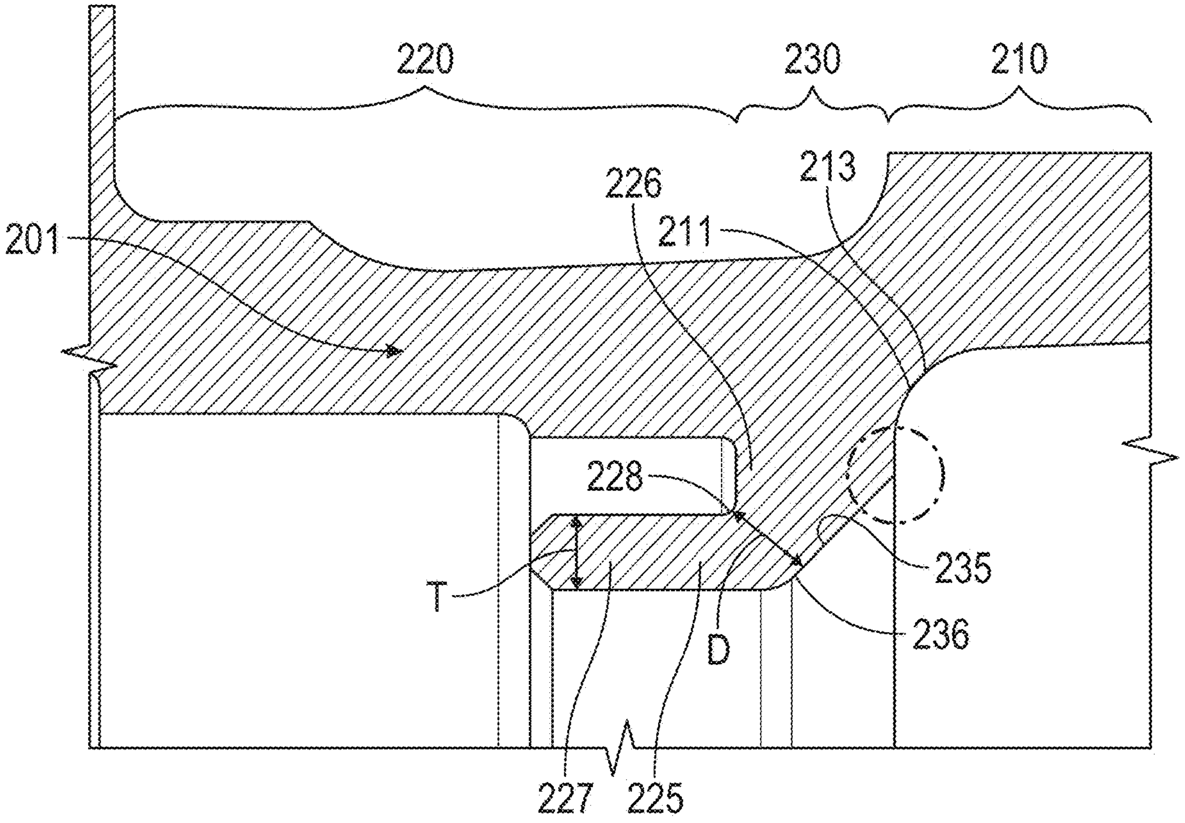
FIG. 2 is an enlarged side view of a portion of a split case of a portion of a compressor section of the gas turbine engine of FIG. 1 in accordance with embodiments.
Figure 3:
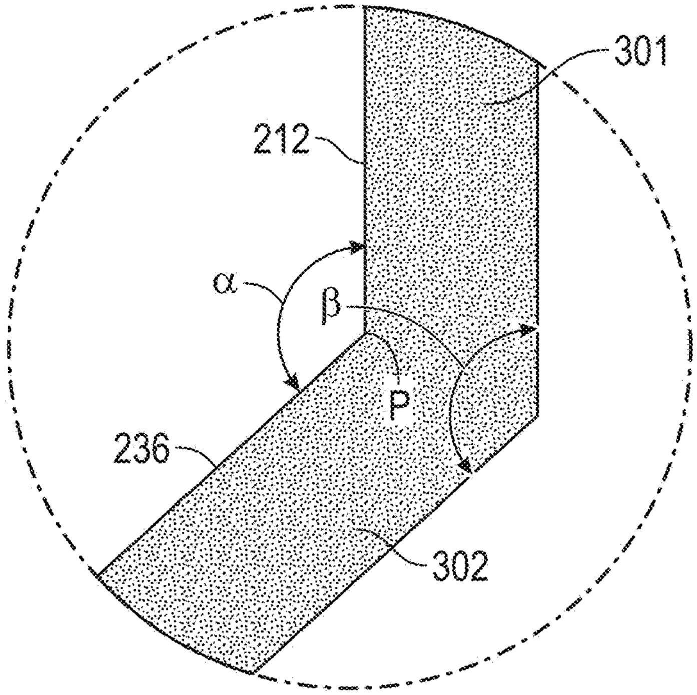
FIG. 3 is an enlarged side view of the encircled portion of FIG. 2 in accordance with embodiments.

With reference to FIGS. 2 and 3, a split case 201 is provided for use in a casing of a compressor, such as the compressor section 24 of FIG. 1. The split case 201 includes a first section 210, a second section 220 and a third section 230. The first section 210 includes an interior surface 211 with a first linear portion 212 (see FIG. 3). The first linear portion 212 can be oriented substantially along a radial dimension (i.e., vertical in the image of FIG. 2) or, in some cases, oriented short of the radial dimension in the aft direction. The interior surface 211 can further include a curvilinear portion 213 that extends curvilinearly from an outboard end of the first linear portion 212. The second section 220 includes a hook 225.

The third section 230 is axially interposed between the first section 210 and the second section 220 and includes an interior surface 235 with a second linear portion 236 (see FIG. 3). The second linear portion 236 intersects with and forms a first angle $\alpha$ with the first linear portion 212. In accordance with embodiments, the first angle $\alpha$ is a simple angle that does not exhibit a burr or cusp in that the first angle $\alpha$ is formed only by proximal straight ends of the first linear portion 212 and the second linear portion 236 (i.e., there is an absence of a burr or cusp formed at an intersection point P (see FIG. 3) of the first linear portion 212 and the second linear portion 236).

As shown in FIG. 3, the split case 201 can further include a first TBC portion 301 applied to the first linear portion 212 and a second TBC portion 302 applied to the second linear portion 236. In these or other cases, a magnitude of the first angle $\alpha$ is established such that the first TBC portion 301 and the second TBC portion 302 cooperatively form a second angle $\beta$ that is substantially equal to the first angle $\alpha$ owing to the first angle $\alpha$ being the simple angle that does not exhibit a burr or cusp. In accordance with embodiments, the first angle α can have a magnitude of about 120°.

The hook 225 includes a radial section 226 and an axial section 227 extending away from first angle α from an inboard end of the radial section 226. A distance D between an interior corner 228 of the hook 225 and the second linear portion 236 should exceed a thickness T of the axial section 227. This effectively limits an upper magnitude of the first angle α.

Figure 4:
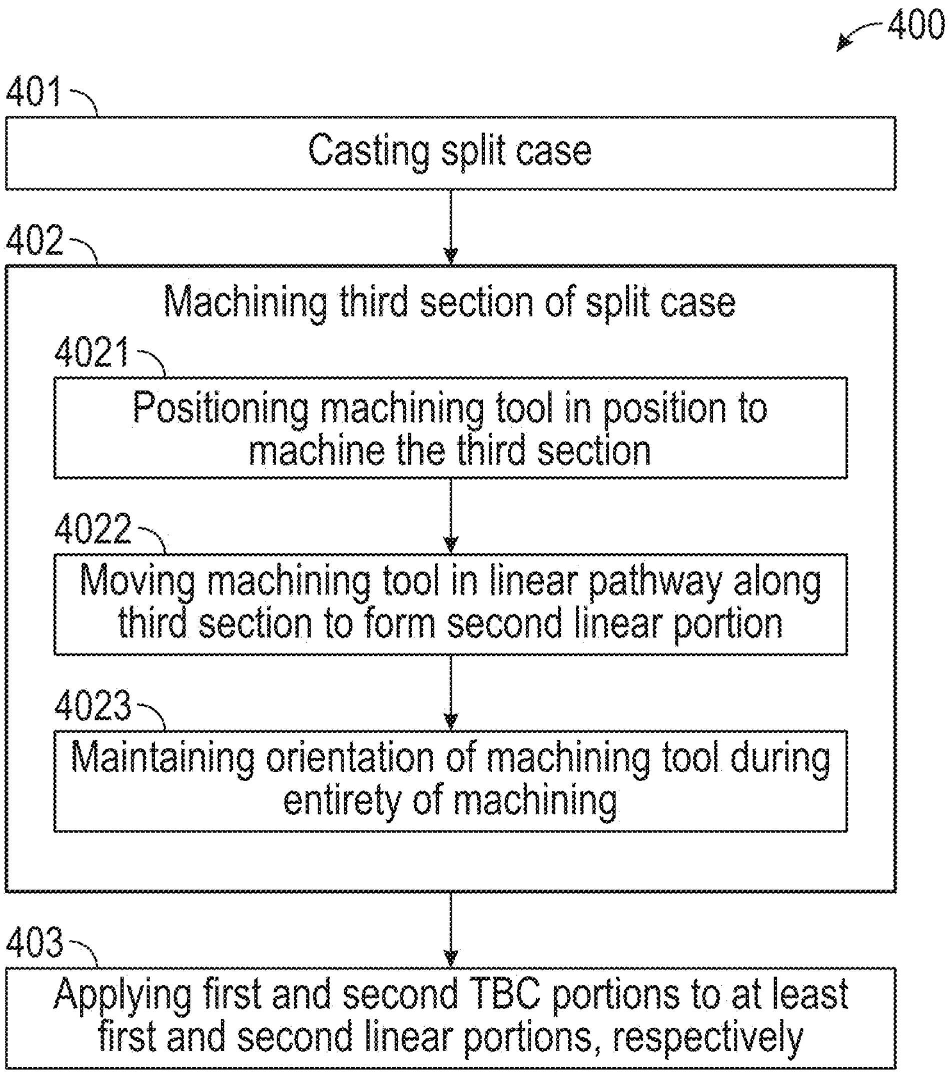
FIG. 4 is a flow diagram illustrating a split case formation method in accordance with embodiments.

With reference to FIG. 4, a split case formation method 400 is provided and includes casting a split case (block 401) such that the split case includes first, second and third sections, the first section including an interior surface with a first linear portion, the second section including a hook and the third section being interposed between the first and second sections, and machining the third section (block 402) to form an interior surface with a second linear portion such that the second linear portion intersects and forms a simple angle with the first linear portion at an intersection point of the first and second linear portions. The machining of block 402 can include positioning a machining tool in position to machine the third section (block 4021), moving the machining tool in a linear pathway along the third section to form the second linear portion (block 4022) and maintaining an orientation of the machining tool during an entirety of the machining (block 4023). In accordance with embodiments, the split case formation method 400 can further include applying first and second thermal barrier coating (TBC) portions to at least the first and second linear portions, respectively (block 403).

Benefits of the features described herein are the provision of a split case that meets minimum thickness requirements while removing the chance of forming a burr or cusp which can negatively impact a formation of a TBC.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A split case formation method, comprising:

casting a split case comprising first, second and third sections, the first section comprising an interior surface with a first linear portion, the second section comprising a hook and the third section being interposed between the first and second sections; and machining the third section to form an interior surface, the interior surface comprising:

a second linear portion such that the second linear portion intersects and forms an angle with the first linear portion at an intersection point of the first and second linear portions; and a curved portion leading from an end of the second linear portion, which is opposite from the angle, to a linear interior surface of the hook, wherein the machining comprises:

positioning a machining tool in position to machine the third section;

moving the machining tool in a linear pathway along the third section to form the second linear portion and the curved portion; and maintaining an orientation of the machining tool during an entirety of the machining.

2. The split case formation method according to claim 1, wherein the angle is formed between proximal straight ends of the first and second linear portions and with an absence of a cusp formed at the intersection point.

3. The split case formation method according to claim 1, further comprising applying first and second thermal barrier coating (TBC) portions to at least the first and second linear portions, respectively, such that the first and second TBC portions form an angle equal to the angle formed by the first and second linear portions.

4. A split case formation method, comprising:

casting a split case comprising first, second and third sections, the first section comprising an interior surface with a first linear portion, the second section comprising a hook and the third section being interposed between the first and second sections; and machining the third section to form an interior surface, the interior surface comprising:

a second linear portion such that the second linear portion intersects and forms an angle with the first linear portion at an intersection point of the first and second linear portions; and a curved portion leading from an end of the second linear portion, which is opposite from the angle, to a linear interior surface of the hook, wherein the machining comprises:

positioning a machining tool in position to machine the third section;

moving the machining tool in a linear pathway along the third section to form the second linear portion and the curved portion; and non-rotatably maintaining an orientation of the machining tool during an entirety of the machining.

5. The split case formation method according to claim 4, wherein the angle is formed between proximal straight ends of the first and second linear portions and with an absence of a cusp formed at the intersection point.

6. The split case formation method according to claim 4, further comprising applying first and second thermal barrier coating (TBC) portions to at least the first and second linear portions, respectively, such that the first and second TBC portions form an angle to the angle formed by the first and second linear portions.

7. A split case formation method, comprising:

casting a split case comprising first, second and third sections, the first section comprising an interior surface with a first linear portion, the second section comprising a hook and the third section being interposed between the first and second sections; and machining the third section to form an interior surface, the interior surface comprising:

a second linear portion such that a proximal straight end of the second linear portion intersects and forms a first angle with a proximal straight end of the first linear portion at an intersection point of the respective proximal straight ends of the first and second linear portions; and a curved portion leading from an end of the second linear portion, which is opposite from the angle, to a linear interior surface of the hook, wherein the machining comprises:

positioning a machining tool in position to machine the third section;

moving the machining tool in a linear pathway along the third section to form the second linear portion and the curved portion; and non-rotatably maintaining an orientation of the machining tool during an entirety of the machining.

8. The split case formation method according to claim 7, wherein the first angle is formed between proximal straight ends of the first and second linear portions and with an absence of a cusp formed at the intersection point.

9. The split case formation method according to claim 7, further comprising applying first and second thermal barrier coating (TBC) portions to at least the first and second linear portions, respectively, such that the first and second TBC portions form a second angle equal to the first angle.

* * * * *